United States Patent
Mizukoshi

(10) Patent No.: US 7,697,500 B2
(45) Date of Patent: Apr. 13, 2010

(54) HOST DEVICE, DEVICE UNIT, COMMUNICATION SYSTEM, AND DATA TRANSMISSION/RECEPTION METHOD

(75) Inventor: Nobuyuki Mizukoshi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1154 days.

(21) Appl. No.: 11/302,351

(22) Filed: Dec. 14, 2005

(65) Prior Publication Data

US 2008/0008154 A1    Jan. 10, 2008

(30) Foreign Application Priority Data

Dec. 27, 2004    (JP)    ............... 2004-377671

(51) Int. Cl.
*H04B 7/212*    (2006.01)
*H04L 12/413*    (2006.01)

(52) U.S. Cl. ...................... 370/347; 370/445

(58) Field of Classification Search ............. 370/475, 370/449, 458, 459, 461, 462, 347, 445
See application file for complete search history.

(56) References Cited

U.S. PATENT DOCUMENTS

2005/0163117 A1* 7/2005 Rhim et al. .................. 370/389
2005/0278470 A1* 12/2005 Lin et al. .................... 710/309
2006/0159123 A1* 7/2006 Fleury et al. ................. 370/468
2007/0058548 A1* 3/2007 Babonneau et al. ......... 370/235.1
2008/0137653 A1* 6/2008 Jonsson ....................... 370/389

FOREIGN PATENT DOCUMENTS

JP    2002-300175    10/2002

* cited by examiner

*Primary Examiner*—Brian D Nguyen
(74) *Attorney, Agent, or Firm*—McGinn IP Law Group, PLLC

(57) ABSTRACT

A host device according to an embodiment of the present invention sends to a plurality of device units a specific token packet including address information of a first device unit and a general token transmission time derived from an execution time of a plurality of consecutive transactions upon execution of the plurality of consecutive transactions with a first device unit out of the plurality of device units. The first device unit receives the specific token packet to execute the plurality of transactions. The plurality of device units other than the first device unit receive the specific token packet to shift to and stay in a suspend state until the general token transmission time elapses, and then shift to a waiting state after the general token transmission time.

22 Claims, 13 Drawing Sheets

GENERAL TOKEN PACKET

SPECIFIC TOKEN PACKET

IN/OUT DATA PACKET

HANDSHAKE PACKET

GENERAL TOKEN PACKET

SPECIFIC TOKEN PACKET

IN/OUT DATA PACKET

HANDSHAKE PACKET

RELATED ART

TOKEN PACKET

IN/OUT DATA PACKET

HANDSHAKE PACKET

HOST DEVICE, DEVICE UNIT, COMMUNICATION SYSTEM, AND DATA TRANSMISSION/RECEPTION METHOD

BACKGROUND OF THE INVENTION

1. Field of the Invention

The present invention relates to a communication system including a host device and plural device units, and more specifically to a communication system adopting a communication protocol such as a USB (universal serial bus), which starts data transmission/reception between a host device and a device unit using token packets from the host device. In particular, the invention relates to a technique of saving power consumption in a device unit in such a communication system.

2. Description of Related Art

The USB (universal serial bus) standard is a communication standard that allows data transmission/reception between a single host device and plural device units; a PC typifies the host device, and its peripheral devices typify the device units. This USB standard has been put in widespread use as a communication interface for connecting the PC and the peripheral devices. The USB standard adopts a star logical bus topology where a single host device is connected with the plural device units. In the following description, a system composed of a single host device and plural device units connected therewith is called a USB system.

The communication between the host device and the device units, which conforms to the USB standard is dependent on the host device. The host device sends token packets to the device units to start the communications with the device units. A series of processings from the transmission of the token packets to the completion of the data exchange are executed in three stages of token phase, data phase, and handshake phase. These series of processings are collectively called "transaction".

Referring to FIG. 13 and FIGS. 14A to 14C, a data transmission/reception processing in a conventional USB system is described. FIG. 13 is a timing chart of a data transmission/reception timing in the conventional USB system. FIGS. 14A to 14C show the configuration of a USB packet exchanged between the host device and the device units. In FIG. 13, token intervals n, n+1, ... indicate time intervals at which the host device sends the token packets, and each of processings defined by the token intervals n, n+1, ..., corresponds to one transaction. For example, the transaction of the token interval n is an OUT transaction for sending data from the host device to a device unit A. In the token interval n, first, the host device sends an OUT token packet 1301Tx. Here, Tx and Rx denote the packet transfer direction; Tx denotes a transmission packet, and Rx denotes a reception packet. The host device sends an OUT data packet 1302Tx following the OUT token packet 1301Tx. Finally, the device unit A receiving the OUT data packet 1302Rx sends a handshake packet 1303Tx to the host device, and the host device receives this packet to thereby complete one OUT transaction.

When the host device sends the OUT token packet 1301Tx, all the device units A to C that stand ready to receive a token packet receive the token packet 1301Rx. Among the device units having received the token packets 1301Rx, the device unit A designated as a corresponding node receives data, while the devise units B and C are kept on standby in preparation for the next transmission of a token packet, that is, kept ready for reception of the token packet (hereinafter, referred to as "waiting state").

Here, the OUT token packet 1301Tx is a token packet indicative of the start of the OUT transaction from the host device to the device units. FIG. 14A shows the configuration of the token packet. As regards the OUT token packet 1301, a PID value indicating the OUT transaction is specified in a PID1401, and the device unit A as a corresponding node is designated based on an address (ADDR) 1402 and an endpoint (ENDP) 1403. Further, as shown in FIG. 14B, the OUT data packet 1302 is composed of, a PID1404 indicating a data packet type and a data unit 1405. As shown in FIG. 14C, the handshake packet 1303 is composed of a PID1406, and a PID value representing whether the data reception is succeeded or failed is specified.

On the other hand, the transaction of the token interval n+1 shown in FIG. 13 is an IN transaction for sending the data from the device unit to the host device. In the case of IN transaction, the host device designates a device unit which is allowed the data transmission by sending the token packet 1304Tx. The device unit B designated with the token packet 1304 sends an IN data packet 1305Tx to the host device. When the host device succeeds in receiving the IN data packet 1305Rx, the handshake packet 1306Tx is sent back to complete the IN transaction.

As mentioned above, the data transmission/reception between the host device and the device unit in conformity with the USB standard starts with the transmission of the token packet inclusive of the designation of the device unit as a corresponding node with the host device.

In the USB system, the host device generally sends the token packet at a given timing, not at regular intervals. Therefore, the device unit not executing the transaction needs to be kept in a waiting state that allows the reception of the next token packet from the host device.

Thus, as shown in a timing chart of FIG. 15, especially in the case of continuously exchanging the data between the host device and a specific device unit, the other device units waste power. The host device continuously exchanges data with the device B between the token intervals n+1 and n+3 of FIG. 15; during such a period, the device units A and C not involved in data exchange with the host device also receives and interprets the token packet sent by the USB host every transaction, but the received token packet is not a token packet addressed to the device units A and C, so the device units A and C should be kept in a waiting state. As mentioned above, the other devices not involved in data exchange need to receive and interpret the token packets from the host device while being kept in the waiting state, and thus waste power.

Hitherto, the connection between the host device and the device units has been based on a cable. A new standard (hereinafter, referred to as wireless USB) adopting a wireless interface for a physical layer connecting between the host device and the device units has been under development. Upon such wireless communications, especially, power saving/long-term operation is required.

Japanese Unexamined Patent Publication No. 2002-300175 discloses a technique for reducing power consumption on a terminal station in a wireless communication system of CSMA system conforming to IEEE802.11b. To be specific, in sending data from an access point to a terminal station, a transmission time as information about the time until the next data transmission to the terminal station is added to transmission data. The terminal station receiving data including the transmission time stops the operation until the transmission time elapses, and after the elapse of the transmission time, the terminal station returns to a waiting state.

However, the host device of the USB system operates in response to a data transmission/reception instruction from a PC responsible for an upper layer of a USB communication protocol, so the host device cannot schedule the next data transmission/reception for each device unit beforehand. Accordingly, the host device cannot set the next data transmission/reception time for each device unit, and notify each device unit of the time. Hence, it is difficult to apply the technique disclosed in Japanese Unexamined Patent Publication No. 2002-300175 to the USB system.

During the unrelated transaction, the devices should receive the token packet and thus waste power in any other systems than the USB system, more specifically, in communication systems for exchanging data between the host device and plural device units. This problem is common to the communication systems adopting a communication protocol that starts the transaction between the host device and the device units in accordance with the token packet from the host device, as in the USB system.

SUMMARY OF THE INVENTION

In light of the above circumstances, the present invention has recognized that in the case of continuously executing data transmission/reception between a host device and a specific device unit in the communication systems including the host device and the plural device units and adopting a communication protocol that starts data transmission/reception between the host device and the device units with the token packet from the host device, the other device units not involved in data transmission/reception waste power.

A host device according to an aspect of the invention transmits/receives data to/from a plurality of device units and executing a transaction with the device units in response to a token packet from the host device. The host device includes: a packet generator generating a specific token packet including address information of a device unit as a corresponding node and suspend time information upon executing two or more consecutive transactions with the device unit as the corresponding node; and a transmitter transmitting the specific token packet to the plurality of device units to start the consecutive transactions. Further, the host device does not execute transactions with the device units other than the device unit as the corresponding node designated with the specific token packet until a time period determined based on the suspend time information added to the specific token packet elapses.

A data transmission/reception method according to another aspect of the invention is used for a host device communicating with a plurality of device units. The method includes: generating a specific token packet including address information of a device unit as a corresponding node and suspend time information upon executing two or more consecutive transactions with the device unit as the corresponding node; transmitting the specific token packet to the plurality of device units at the start of the transactions with the device unit as the corresponding node; executing the two or more transactions with the first device unit; and executing a transaction with the device units other than the device unit as the corresponding node after the elapse of a time determined based on the suspend time information.

According to the host device and the data transmission/reception method used for a host device, the device units not involved in consecutive transactions can recognize the time period during which the device units stay in a waiting state that allows reception of the token packet. Hence, the device units not involved in the consecutive transactions can stop the operation of receiving token packets until the time period elapses, thereby saving power consumption.

A device unit according to another aspect of the invention transmits/receives data to/from a host device. The device unit includes: a receiver receiving a specific token packet including address information of a device unit as a corresponding node and suspend time information, which is sent from the host device; and a controller controlling a device operation based on the specific token packet, which executes data transmission/reception with the host device if the address information in the specific token packet specifies own device, and suspends an operation of the receiver until a return time determined based on the suspend time information if the address information in the specific token packet does not specify own device to resume the operation of the receiver after the return time.

A data transmission/reception method according to another aspect of the invention is used for a host device communicating with a plurality of device units. The method includes: receiving from the host device a specific token packet including address information of a device unit as a corresponding node, and suspend time information; executing data transmission/reception if the address information in the specific token packet specifies a target device; and executing a transaction with the device units other than the first device unit after the elapse of a time determined based on the suspend time information, and suspending a data transmission/reception operation with the host device until the return time determined based on the suspend time information if the address information in the specific token packet does not specify the target device until a return time determined based on the suspend time information to resume the data transmission/reception operation after the return time.

According to the host device and the data transmission/reception method used for a host device, the device units not involved in consecutive transactions can recognize the time period during which the device units stay in a waiting state that allows reception of the token packet. Hence, the device unit according to the present invention can save power consumption in the case of continuously executing the data transmission/reception between the host device and other device units.

A communication system according to another aspect of the invention includes a host device and a plurality of device units. The communication system starting data transmission/reception between the host device and the device units in response to a token packet sent from the host device. The host device sends a specific token packet including suspend time information and address information of a first device unit out of the plurality of device units to the plurality of device units upon consecutively executing a plurality of transactions with the first device unit. The first device unit receiving the specific token packet executes data transmission/reception with the host device through the plurality of transactions. The plurality of device units other than the first device unit receiving the specific token packet to stop a data transmission/reception operation with the host device until a return time determined based on the suspend time information and resume the data transmission/reception operation after the return time.

According to the system configuration, the device units not involved in consecutive transactions can recognize the time period during which the device units stay in a waiting state that allows reception of the token packet, and can stop the operation of receiving token packets until the time period elapses, thereby saving power consumption.

According to the present invention, it is possible to provide a device unit capable of saving power, and a host device, a communication system, and a data transmission/reception method, which can execute control to reduce power consumption of the device unit in a communication system composed of the host device and plural device units.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

The configurations of a host device and a device unit related to the present invention are explained hereinafter. The host device related to the present invention transmits/receives data to/from a plurality of device units and executing a transaction with the device units in response to a token packet from the host device. The host device has a packet generator and a transmitter. The packet generator generates a specific token packet including address information of a first device unit as a corresponding node and suspend time information upon executing two or more transactions with the first device unit. The transmitter transmits the specific token packet to the plurality of device units to start the two or more transactions with the first device unit. Further, the host device does not execute transactions with the device units other than the first device unit until a time period determined based on the suspend time information added to the specific token packet elapses.

The device unit related to the present invention transmits/receives data to/from a host device. The device unit has a receiver and a controller. The receiver receives a specific token packet including address information of a device unit as a corresponding node and suspend time information, which is sent from the host device. The controller controls a device operation based on the specific token packet. Further, the controller executes data transmission/reception with the host device if the address information in the specific token packet specifies own device, and suspends an operation of the receiver until a return time determined based on the suspend time information if the address information in the specific token packet does not specify own device to resume the operation of the receiver after the return time.

The concrete configurations of the host device and the device unit related to the present invention are explained hereinafter.

First Embodiment

Figure 1:
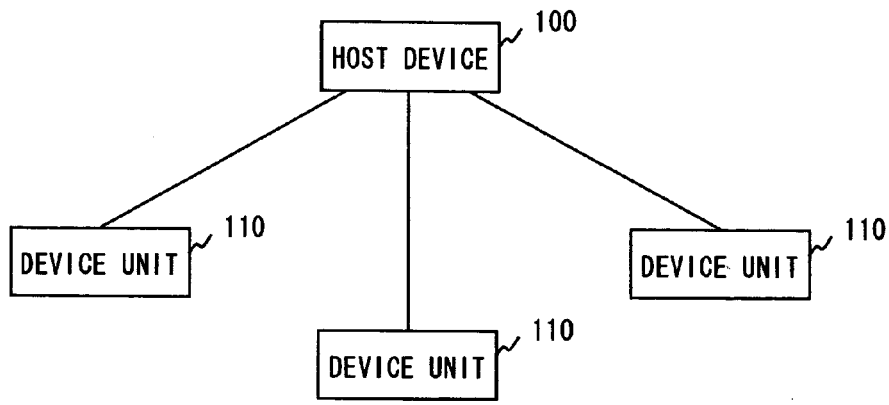
FIG. 1 is a diagram of a USB system according to an embodiment of the present invention.

FIG. 1 shows the configuration of a USB system 1 according to an embodiment of the present invention. The USB system 1 is composed of a single host device 100 and plural device units 110. The number of device units 110 is not limited to the illustrated number. The connection between the host device 100 and the device units 110 of FIG. 1 is based on a logical bus topology, not based on a physical connection relation. For example, the host device 100 and the device units 110 may be connected through a hub or by radio in a wireless USB system.

Figure 14A:
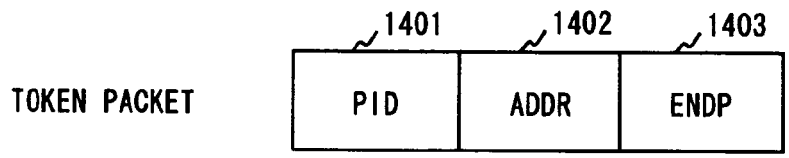
FIGS. 14A to 14C show an example of the USB packet exchanged between a conventional host device and device units.
Figure 14B:
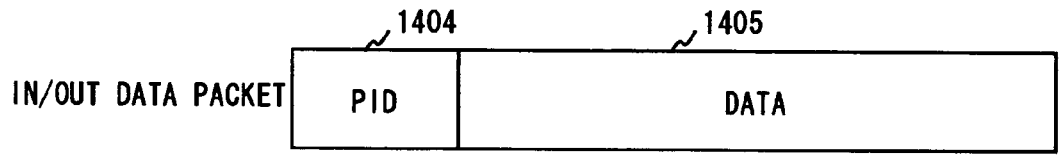
Figure 14C:
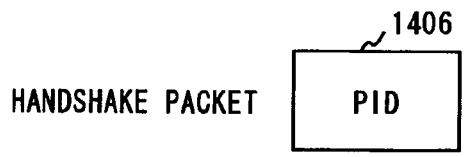

FIGS. 2A to 2D show the configuration of a USB packet exchanged between the host device 100 and the device units 110 in the USB system 1 according to this embodiment. In FIGS. 2A to 2D, the same components as components of the conventional USB packet of FIGS. 14A to 14C are denoted by same reference numerals. A feature of the USB system 1 is that the host device 100 sends two kinds of token packets, a general token packet and a specific token packet.

Figure 2A:
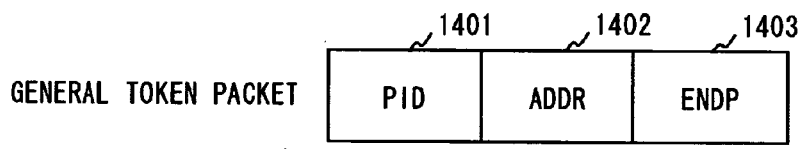
FIGS. 2A to 2D show an example of a USB packet exchanged between a host device and device units according to the embodiment of the present invention.
Figure 2B:
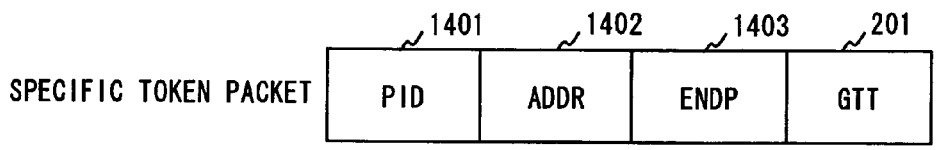
Figure 2C:
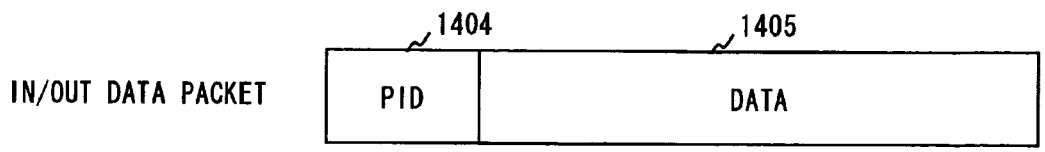
Figure 2D:

The general token packet has the same configuration as the token packet sent from the conventional host device at the time of starting the transaction. More specifically, as shown in FIG. 2A, the general token packet is composed of a PID1401, an address 1402, and an endpoint 1403. On the other hand, a specific token packet has a general token transmission time (GTT) 201 in addition to the components of the general token packet. The general token transmission time (GTT) 201 indicates a time when the host device 100 next issues a general token packet to be received by all the device units 110. To be specific, as shown in FIG. 2B, the token packet has the GTT 201 includes the PID1401, the address 1402, and the endpoint 1403. The data packet of FIG. 2C and the handshake packet of FIG. 2D are the same as the USB packet exchanged in the conventional USB system of FIGS. 14B and 14C, so their description is omitted here.

The host device 100 sends a general token packet similar to the conventional token packet to start transaction in the case of starting the data transmission/reception processing with any device unit 110, and completing the data transmission/reception processing with one IN transaction or OUT transaction. Meanwhile, in the case of transmitting/receiving a large volume of data, the data transmission/reception processing is divided into plural transactions, and if it is necessary to continuously execute plural transactions between the specific device unit 110 and the host device, a specific token packet is sent to start the transaction.

Figure 3:
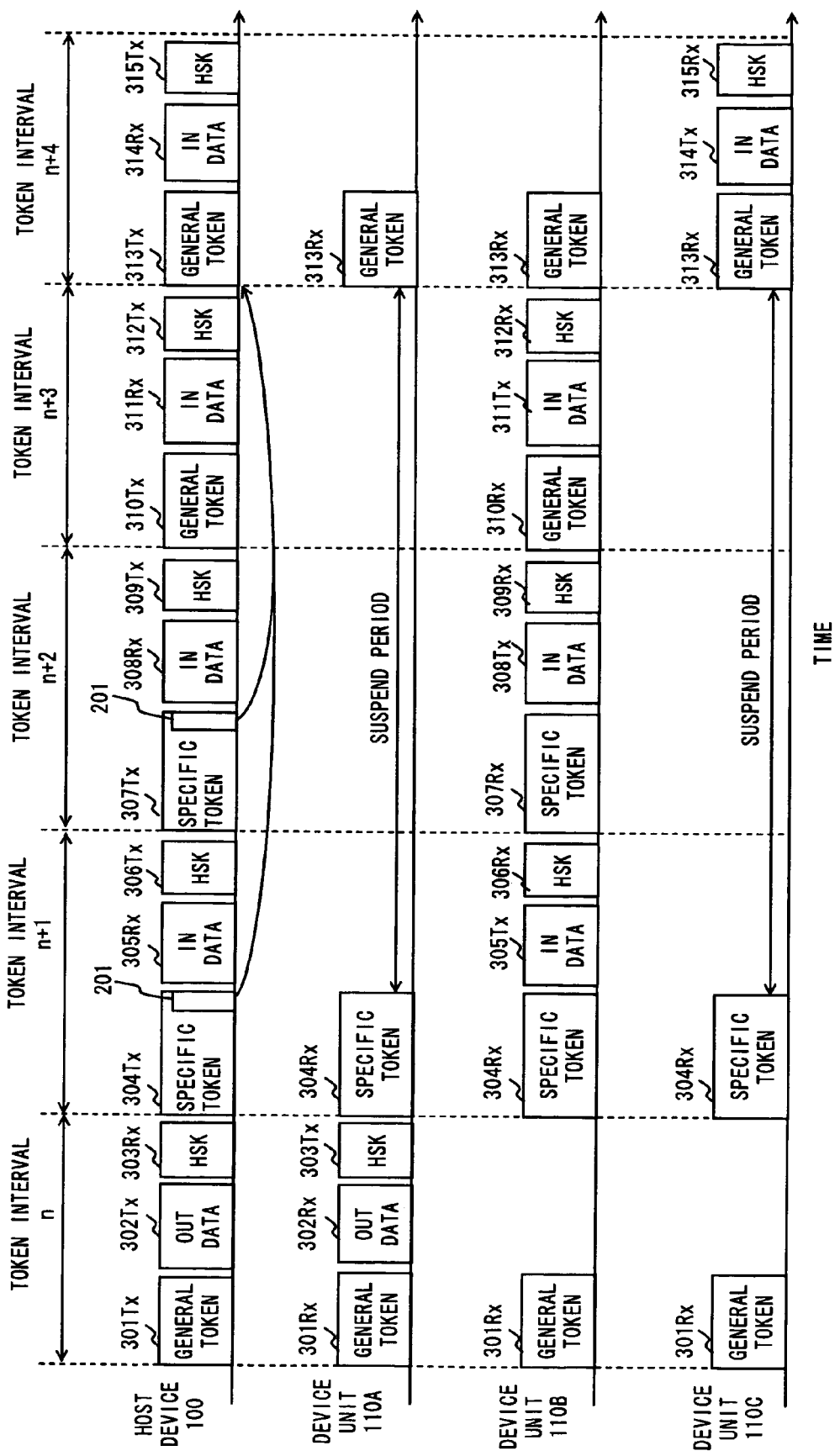
FIG. 3 is a timing chart of a data transmission/reception timing of the USB system according to the embodiment of the present invention.
Figure 15:
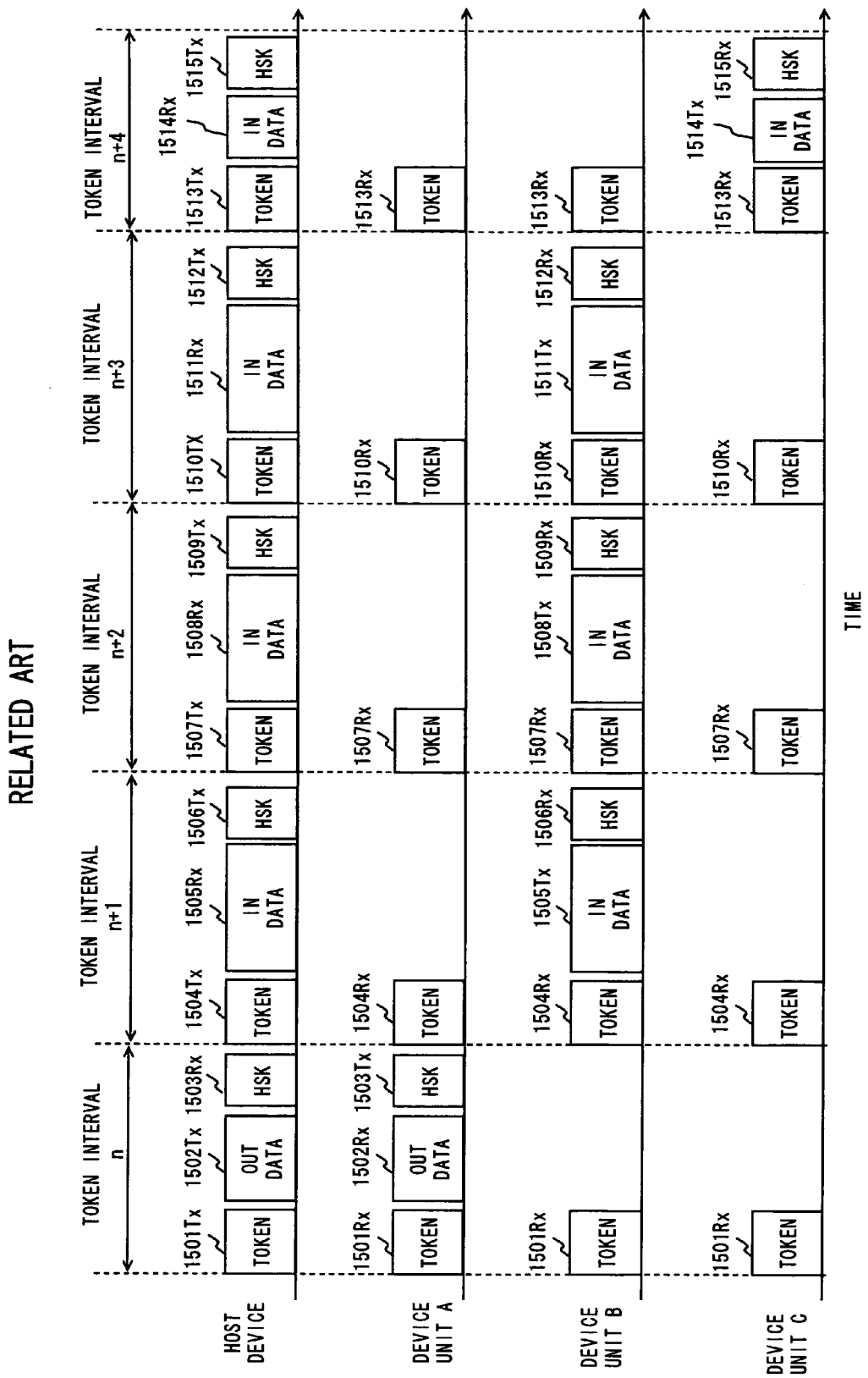
FIG. 15 shows a data transmission/reception timing of a conventional USB system.

The data transmission/reception processing of the USB system according to this embodiment is described with reference to FIG. 3. FIG. 3 is a timing chart of data transmission/reception timings in the USB system 1. For ease of comparison with a conventional one, the same data transmission/reception processing as the conventional USB system of FIG. 15 is illustrated. In FIG. 3, each of processings defined by the token intervals n, n+1, . . . , corresponds to one transaction.

The transaction of the token interval n is a transaction started with the transmission of the general token packet 301, which is the same as the transaction of the conventional USB system. During the token interval n, first, the host device 100 sends the general OUT token packet 301Tx. Here, Tx and Rx indicate a packet transfer direction; Tx is a transmission packet and Rx is a reception packet. The host device 100 sends an OUT data packet 302Tx following the general OUT token packet 301Tx. The device units 110A having received the OUT data packet 302Rx sends a handshake packet 303Tx to the host device, and the host device 100 receives the handshake packet to complete one OUT transaction. At this time, the device units 110B and 110C receive the general OUT token packet 301Rx, and if determining that own devices are not designated in an address (ADDR) 1402, remain in a waiting state and wait for the transmission of the next token packet.

On the other hand, the transaction of the token interval n+1 is a transaction started with the transmission of a specific token packet 304. During the token interval n+1, first, the host device 100 sends a specific IN token packet 304Tx. The device unit 110B designated by the specific IN token packet 304 send an IN data packet 305Tx to the host device 100. When succeeding in receiving the IN data packet 305Rx, the host device 100 sends the handshake packet 306Tx to the device unit 110B to complete the IN transaction. At this time, the device units 110A and 110C receive a specific IN token packet 304Rx, and if determining that own addresses are not designated in the address (ADDR) 1402, shifts to a suspend state and stays at rest until the transmission time of the general token packet 313 specified by the next general token transmission time GTT201.

The transactions of the token intervals n+2 and n+3 is the IN transaction with the device unit 110B following the transaction of the token interval n+1. During this period, only the device unit 110B receives the token packets 307Rx and 310Rx from the host device 100 to execute the transaction. Note that in FIG. 3, the token packet 307 is assumed a specific token packet, and the token packet 310 is a general token packet. The reason is as follows.

By setting the token packet 307 as a specific token packet, even if some of the device units 110 that fail in receiving first specific token packet 304Rx, the device units can advantageously shift to a suspend state in accordance with the second reception of the specific token packet 307Rx.

Further, since the token packet 310 is the final transaction output the consecutive IN transactions with the device unit 110B, even if the device units shift to a suspend state in accordance with the reception of the token packet 310Rx, the devices should return to the reception state at once. Accordingly, there is little limit that the device shifts to a suspend state in accordance with the reception of the token packet 310, so the token packet 310 is set as a general token packet.

The token packets 307 and 310 may be both specific token packets or general token packet. By setting at least the first token packet 304 of the consecutive transactions (token intervals n+1 to n+3) between the host device 100 and the device unit 110B as a specific token packet, the device units 110A and 110C not involved in the transaction can shift to a suspend state.

FIG. 3 shows the case where the consecutive transactions of the token intervals n+1 to n+3 are IN transaction. Likewise, in the case of continuously executing the OUT transaction with a specific device unit 110, a specific OUT token packet is send to shift the device units 110 not involved in the data exchange to a suspend state.

Finally, the transaction of a token interval n+4 is a general transaction executed after the completion of the consecutive transactions of token intervals n+1 to n+3, so the same processing as the transaction of the token interval n is executed. More specifically, when the host device 100 sends a general IN token packet 313Tx, all the device units 110A to 110C receive the token packet, and the device unit 110C specified by an address (ADDR) 1402 of a general IN token packet 313 sends an IN data packet 314Tx. On the other hand, the device units 110A and 110B determine that own devices are not specified in the address (ADDR) 1402 of a general IN token packet 313 stay in a waiting state and wait for the transmission of the next token packet.

In this way, in the USB system 1 according to this embodiment, the host device 100 sends two kinds of token packets, a general token packet and a specific token packet. Further, the device units 110 receiving a specific token packet not addressed to own devices is shifted to a suspend state. Hence, in the case of continuously executing the transaction between the host device 100 and a specific device unit 110, the device units 110 not involved in the consecutive transactions can shift to a suspend state to reduce power consumed during a token packet waiting period.

Further, in the USB system 1 according to this embodiment, the host device 100 notifies suspend time information common to all device units not involved in the consecutive transactions using a specific token packet. Therefore, the host device 100 determines the next data transmission time for each device unit 110, and even in the USB system where it is difficult to estimate next data transmission time and to notify each device unit 110 of it, the device units not involved in the consecutive transactions can be shift to a suspend state to save power consumption.

Figure 4:
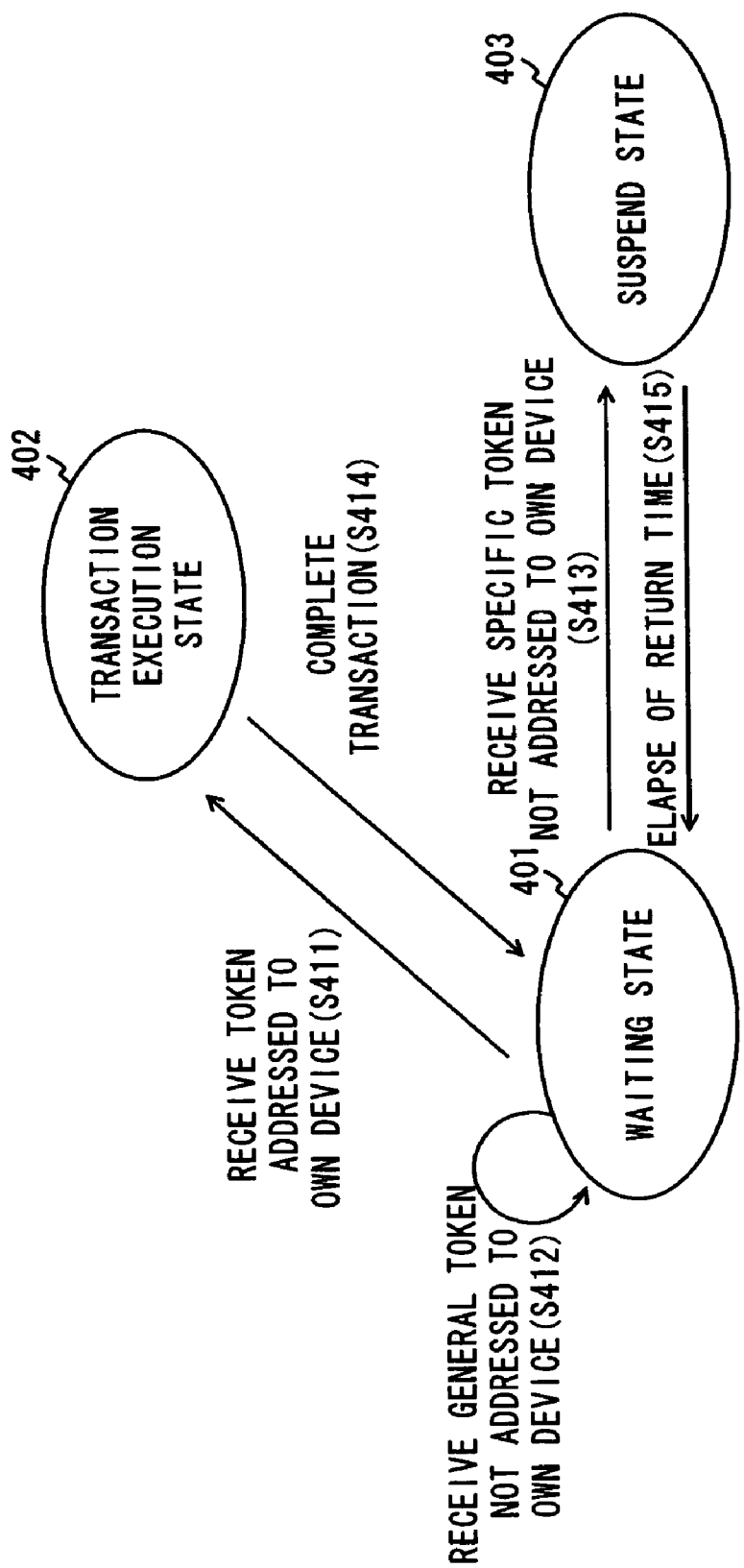
FIG. 4 is a state transition diagram of a device unit according to the embodiment of the present invention.

Referring next to a state transition diagram of FIG. 4, a state transition of the device units 110 is described. The device units 110 shift among a waiting state 401, a transaction execution state 402, and a suspend state 403. Here, the waiting state 401 is a state capable receiving a general token packet or a specific token packet from the host device 100. The transaction execution state 402 is a state of executing a transaction such as the IN transaction and the OUT transaction with the host device 100. The suspend state 403 is a state of neither receiving nor determining the token packet from the host device 100, and portions responsible for those processings are put into a suspend state to thereby prevent wasteful power consumption and enable power saving.

The device units 110 in the waiting state 401 determine, when receiving a general token packet or a specific token packet, whether an address (ADDR) 1402 of the token packet designates own device. If the determination result shows that received token packet is a general token packet or a specific token packet addressed to own device, the device unit shifts to the transaction execution state 402 (S411). On the other hand, the received token packet is a general token packet not addressed to own device, the device unit stays in the waiting state 401 to wait for the reception of the next token packet (S412). Also, the received token packet is a specific token packet not addressed to own device, the device unit shifts to a suspend state 403 (S413).

The device unit 110 in the transaction execution state 402 shifts to a waiting state again at the completion of execution of the transaction (S414). The device unit 110 in the suspend state 403 does not receive and interpret the token packet and shifts to the waiting state 402 till the time designated by a general token transmission time (GTT) 201 passes at the latest (S415).

As mentioned above, the device units 110 shift to the suspend state 403 in response to the reception of the specific token packet not addressed to own device, thereby reducing power necessary for waiting the reception of token packets.

Figure 5:
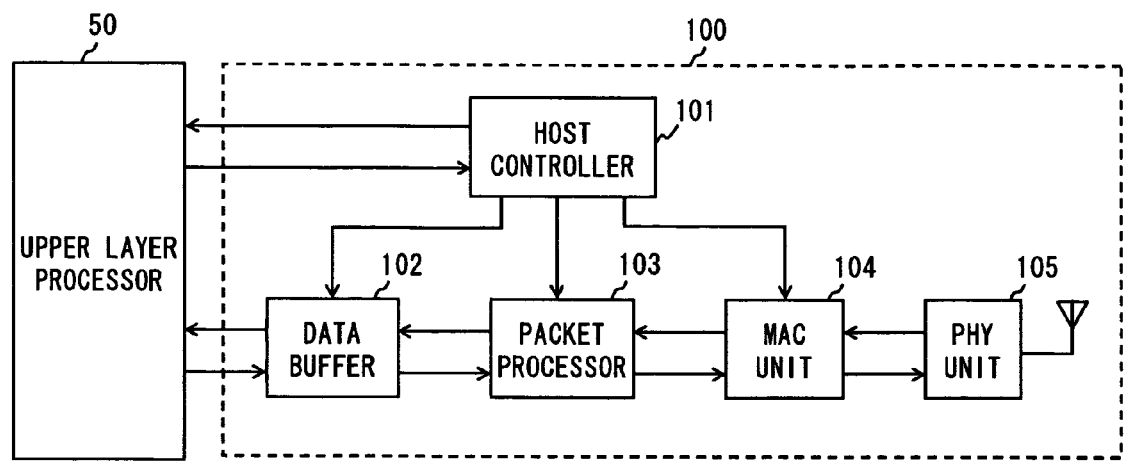
FIG. 5 is a diagram of the host device according to the embodiment of the present invention.

Subsequently, the configuration and operation of the host device 100 and the device units 110 according to this embodiment are described in order. FIG. 5 is a diagram of the host device 100. FIG. 5 illustrates a wireless USB-compliant host device 100 adopting a wireless interface for a physical layer connected with the device units 110 and used for transferring the USB packets.

Figure 6:
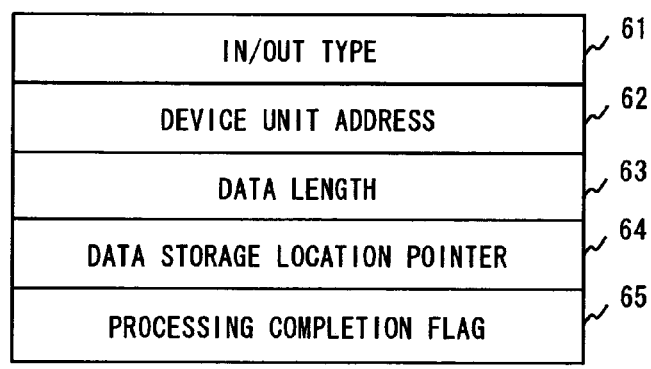
FIG. 6 shows an example of a descriptor.

A host controller 101 acquires a descriptor generated with an upper layer processor 50, and controls a data buffer 102, a packet processor 102, and a MAC unit 104 based on the acquired descriptor. At the completion of the processing indicated by the descriptor, the host controller 101 notifies processing results to the upper layer processor 50. Here, the upper layer processor 50 corresponds to an upper layer of the USB communication protocol, typically, a PC including driver software for a host device. The descriptor is information about data transmission/reception to/from the device units 110. FIG. 6 shows an example of the descriptor.

A descriptor 60 of FIG. 6 includes an IN/OUT type 61, a device unit address 62, a data length 63, a data storage location pointer 64, and a processing completion flag 65. The IN/OUT type 61 is identification information representing whether the data exchange designated with the descriptor 60 is the data reception from the device units 110 (IN) or data transmission to the device units 110 (OUT). The device unit address 62 indicates address information of the device unit 110 as a data transmission/reception destination. The data length 63 indicates a transmission/reception data size. The data storage location pointer 64 indicates positional information about a memory (not shown) in the upper layer processor 50, and means a pointer value representative of a location of the reception data as for the data reception or a pointer value representative of a location of transmission data as for the data transmission. The processing completion flag 65 is flag information indicating that a data transmission/reception processing indicated by the descriptor is completed, and used for the host controller 101 to notify the upper layer processor 50 of the processing completion.

Referring back to FIG. 5, the data buffer 102 is a buffer memory for storing transmission data read from the memory in the upper layer processor 50 (not shown), and storing reception data from the device units 110. The packet processor 103 composes a transmission USB packet and decomposes a reception USB packet. A MAC (media access control) unit 104 is a processor for transmission USB packets, which adds a MAC header including a MAC address of the device unit 110 as a destination to a transmission USB packet created with the packet processor 103. And the MAC unit 104 outputs the resultant to a PHY unit 105. In contrast, the MAC unit 104 removes the MAC header from data received from the PHY unit 105 to output the USB packets to the packet processor 103. The PHY unit 105 is a processor for executing data transmission/reception by radio, the transmission data from the MAC unit 104 is sent to the device units 110, and data received from the device units 110 is output to the MAC unit 104. Applied to the MAC unit 104 and the PHY unit 105 are wireless communication techniques conforming to a wireless LAN standard such as IEEE802.11 or a wireless PAN (personal area network) standard such as IEEE802.15.1, IEEE802.15.3, and IEEE802.15.4, and IEEE802.15.3a that is currently under consideration.

Figure 7:
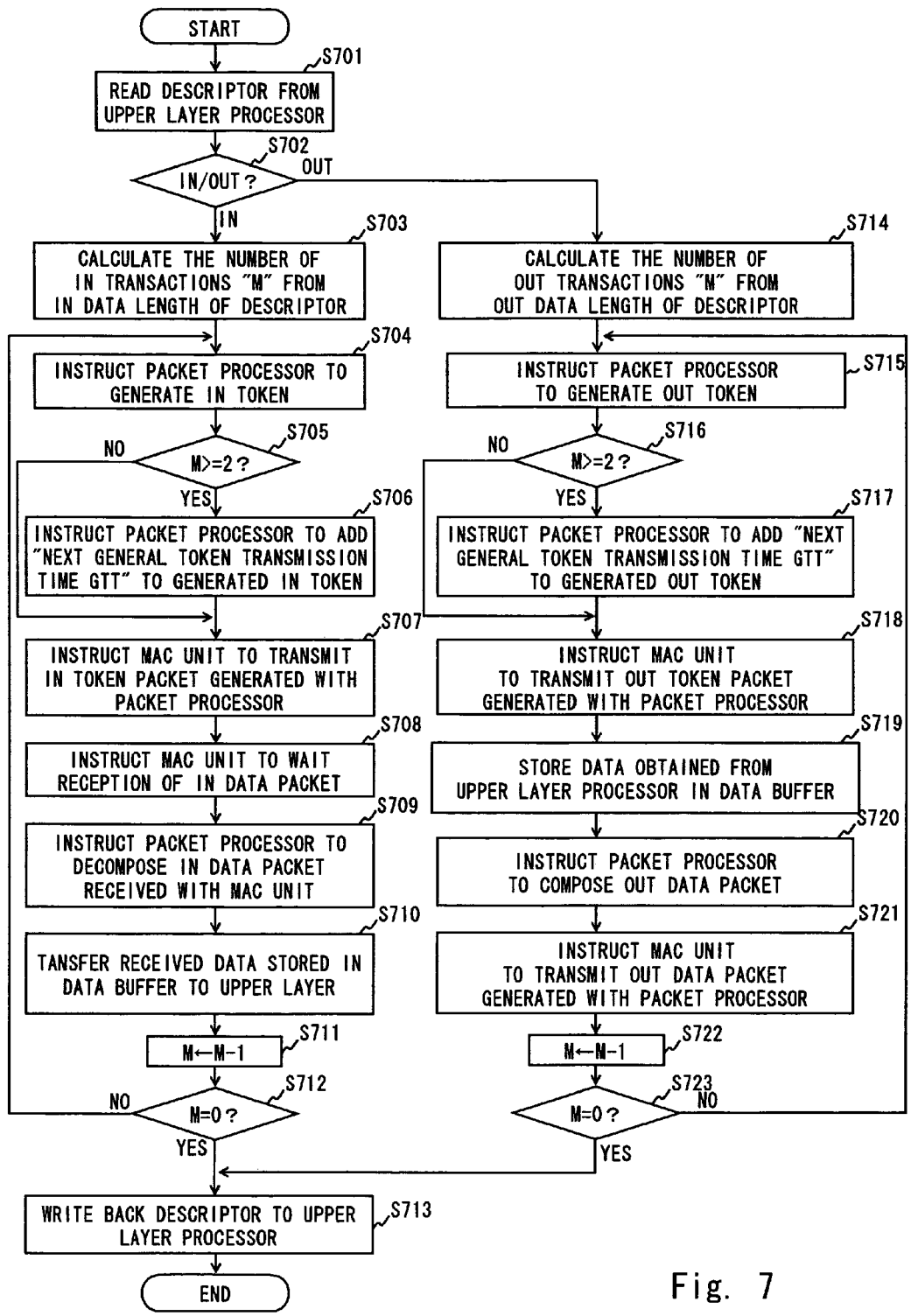
FIG. 7 is an operational flow chart of the host device according to the embodiment of the present invention.

Referring to FIG. 7, the operation of the host device 100 is described next. FIG. 7 is a flowchart of a processing flow of the host controller 101. In step S701, the host controller 101 acquires the descriptor 60 from the upper layer processor 50. In step S702, the host controller 101 determines whether the obtained descriptor 60 indicates the data reception processing (IN processing) or the data transmission processing (OUT processing). The host controller 101 calculates, when the descriptor 60 indicates the IN processing, the requisite number of IN transactions M based on the data length 63 of the descriptor 60 (step S703).

In step S704, the host controller 101 instructs the packet processor 103 to create IN token packets. Further, if the number of transactions calculated in step S703 is 2 or more (step S705), the host controller 101 indicates the packet processor 103 to add a general token packet transmission time (GTT) 201 to the created IN token packet (step S706). As regards the calculation of the general token packet transmission time (GTT), the host controller 101 may determine the time based on the reception data length. Hence, a specific token packet is generated.

In step S707, the host controller 101 instructs the MAC unit 104 to transmit the IN token packet created with the packet processor 103. The instructed MAC unit 104 adds the MAC header to the IN token packet and output to the PHY unit 105. The PHY unit 105 transmits the IN token packet to the device units 110.

In step S708, the host controller 101 instructs the MAC unit 104 to wait for the reception of IN data packets. The MAC unit 104 removes, when receiving IN data packets from the device units 110, the MAC header to be output to the packet processor 103. In step S709, the host controller 101 instructs the packet processor 103 to decompose the IN data packet received from the MAC unit 104. The packet processor 103 stores data extracted from the IN data packet in the data buffer 102. In step S710, the host controller 101 transfers the reception data stored in the data buffer 102 to a location designated with the data location pointer 64 of the descriptor 60.

In step S711, the number of IN transactions M decrements by 1 at the completion of transactions in steps S706 to 710. In step S712, it is determined whether or not all the IN transactions are completed based on whether or not the number of IN transactions M reaches zero. If all the IN transactions are completed, the processing completion flag 65 in the descriptor 60 is set to write back the descriptor 60 to the memory (not shown) in the upper layer processor 50 (step S713). Further, if all the IN transactions have not been completed, the process returns to step S704 to instruct the packet processor 103 to create the IN token packet of the IN transaction.

On the other hand, in the determination of step S702, if the descriptor 60 indicates the OUT processing, the processings of steps S714 to S723 are executed. In step S714, the host controller 101 calculates the requisite number of OUT transactions M based on the data length 63 of the descriptor 60. In step S715, the host controller 101 instructs the packet processor 103 to create the OUT token packet. Further, if the number of transactions calculated in step S714 is two or more (step S716) to instruct the packet processor 103 to add the general token packet transmission time (GTT) 201 to the generated OUT token packet (step S717). As regards the calculation of the general token packet transmission time (GTT), the time may be determined by the host controller 101 based on the transmission data length. Hence, a specific token packet is generated.

In step S718, the host controller 101 instructs the MAC unit 104 to transmit the OUT token packet created with the packet processor 103. The instructed MAC unit 104 adds the MAC header to the OUT token packet to be output to the PHY unit 105, and the PHY unit 105 sends the OUT token packet to the device units 110.

In step S719, the host controller 101 references the data location pointer 64 of the descriptor 60 to acquire transmission data from a memory (not shown) of the upper layer processor 50 and store the acquired data in the data buffer 102. In step S720, the host controller 101 instructs the packet processor 103 to composed the OUT data packet. The packet processor 103 reads transmission data from the data buffer 102 to create the OUT data packets. In step S721, the host controller 101 instructs the MAC unit 104 to transmit the OUT data packet created with the packet processor 103. The instructed MAC unit 104 adds a MAC header to the OUT data packet to be output to the PHY unit 105, and the PHY unit 105 transmits the OUT data packet to the device units 110.

In step S722, the number of OUT transactions M decrements by 1 at the completion of the transactions in steps S715 to S721. In step S723, it is determined whether or not all the OUT transactions have been completed based on whether or not the number of OUT transactions M becomes zero. After all the OUT transactions have been completed, the processing completion flag 65 of the descriptor 60 is set to write back the descriptor 60 to the memory (not shown) of the upper layer processor 50 (step S713). Further, when all the OUT transactions have been not completed, the process returns to step S715 to instruct the packet processor 103 to create the OUT token packet of the next OUT transaction.

With the foregoing construction and operation of the host device 100, in the case of continuously executing the transactions with the specific device unit, the host device 100 creates a specific token packet added with the GTT to be output to the device units 110. Hence, the device units 110 uninvolved with the consecutive transactions can shift to the suspend state in response to the specific token packet, saving the power consumption.

Figure 8:
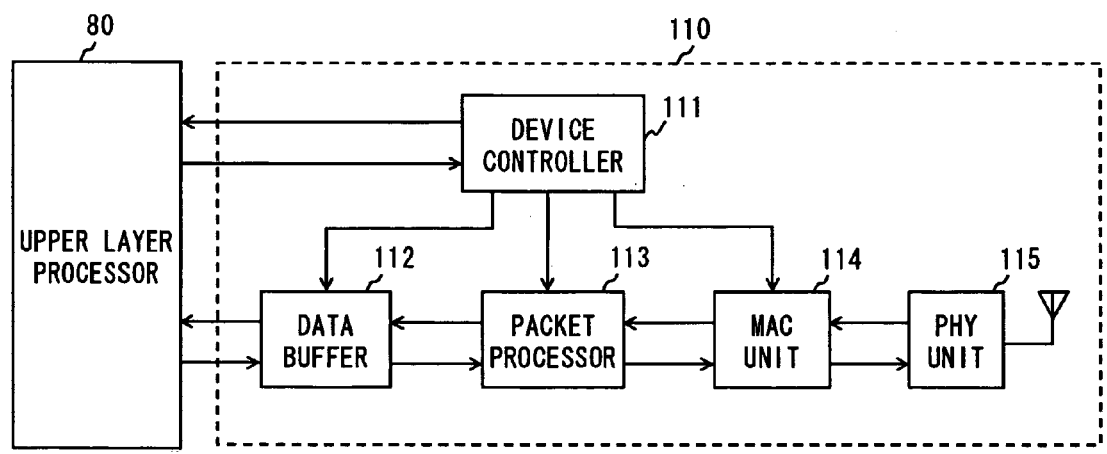
FIG. 8 is a diagram showing a device unit according to the embodiment of the present invention.

Next, the construction and operation of the device units 110 are described. FIG. 8 shows a configuration example of the device units 110. FIG. 8 shows a wireless USB-compliant device unit 110 adopting a wireless interface for a physical layer connected with the host device 100 and used for transferring the USB packets. The device controller 111 controls a data buffer 112, a packet processor 113, and a MAC unit 114 in response to the data transmission/reception request from the upper layer processor 80. Here, the upper layer processor 80 corresponds to the upper layer of the USB communication, for example, peripheral devices of the PC such as a printer, an external storage device such as HDD or DVD drive, a display, and a communication modem.

The data buffer 112 is a buffer memory for storing transmission data from the upper layer processor 80, and reception data from the host device 100. The packet processor 113 composes the transmission USB packet or decomposes the reception USB packet. The MAC (media access control) unit 114 is a processor for transmitting USB packets to add the MAC header including the MAC address of the host device 100 to the transmission USB packet created with the packet processor 113 to be output to the PHY unit 115. In contrast, the MAC unit 114 removes the MAC header from the data input from the PHY unit 115 to send the USB packets to the packet processor 113. The PHY unit 115 is a processor for data transmission/reception by radio to send the transmission data from the MAC unit 114 to the host device 100, and send the data received from the host device 100 to the MAC unit 114. Similar to the host device 100, applied to the MAC unit 114 and PHY unit 115 are wireless communication techniques conforming to a wireless LAN standard such as IEEE802.11 or a wireless PAN (personal area network) standard such as IEEE802.15.1, IEEE802.15.3, and IEEE802.15.4, and IEEE802.15.3a that is currently under consideration.

Figure 9:
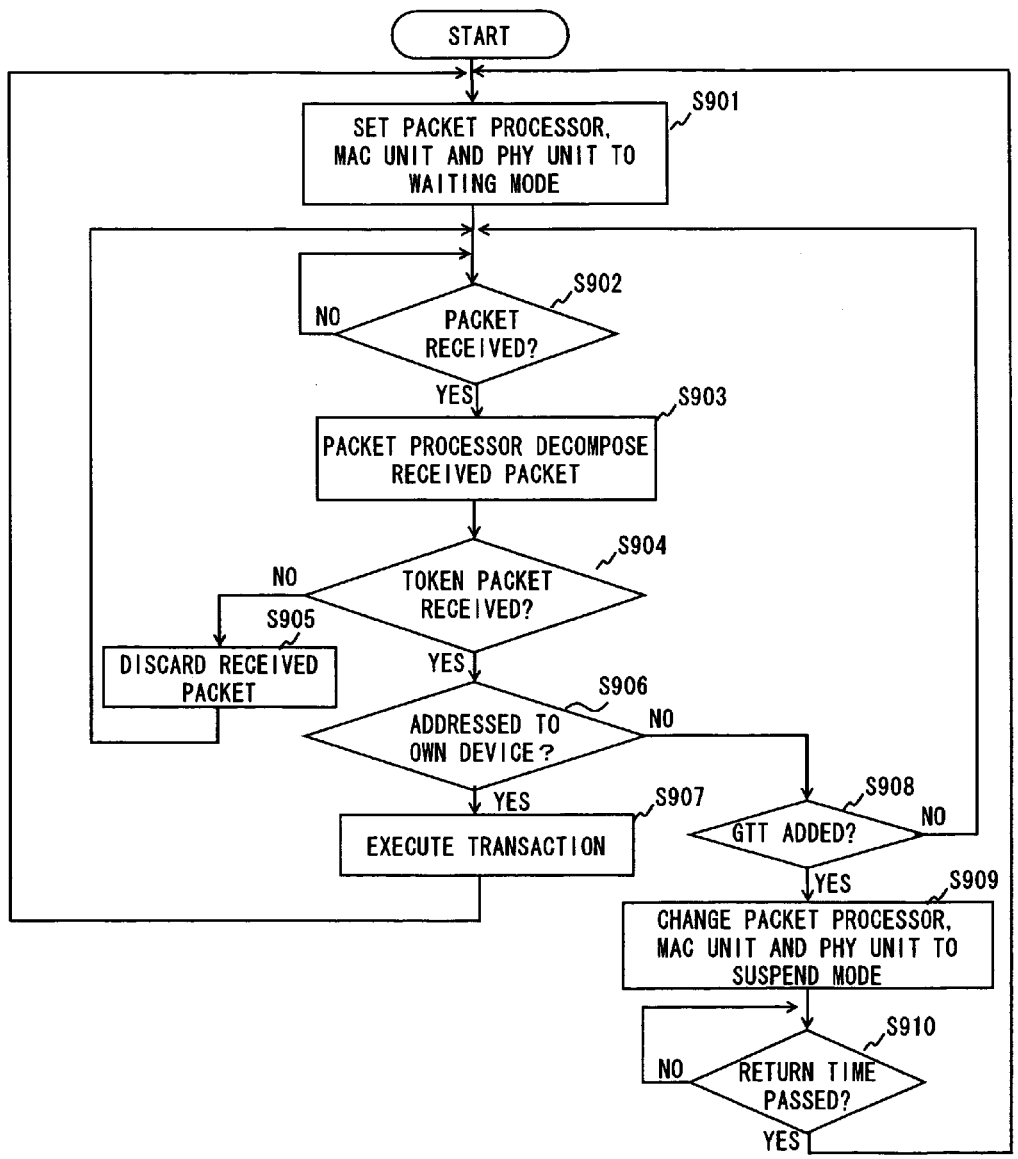
FIG. 9 is an operational flow chart of the device unit according to the embodiment of the present invention.
Figure 10:
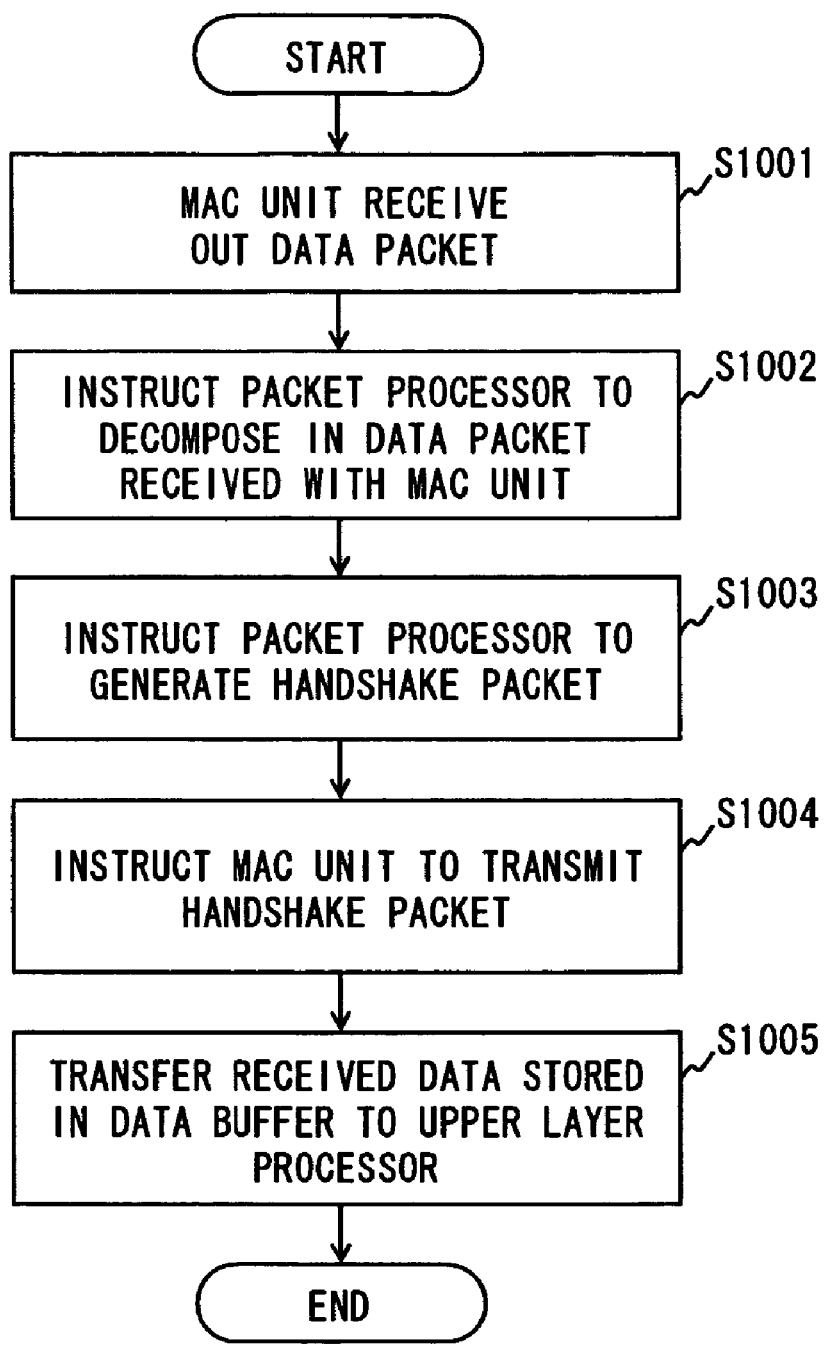
FIG. 10 is an operational flow chart of the device unit according to the embodiment of the present invention.
Figure 11A:
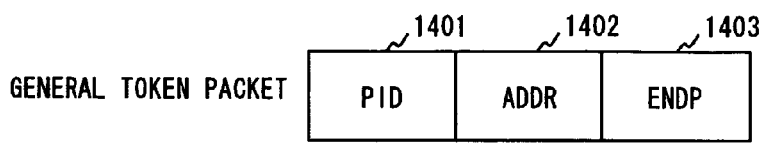
FIGS. 11A to 11D show an example of the USB packet exchanged between the host device and the device units according to the embodiment of the present invention.
Figure 11B:
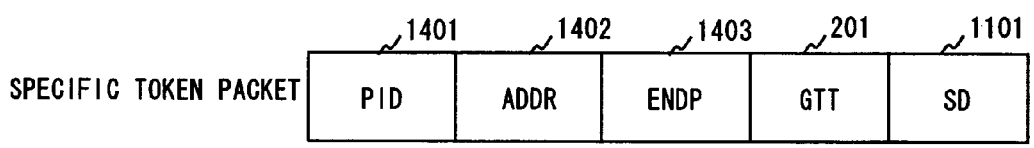
Figure 11C:
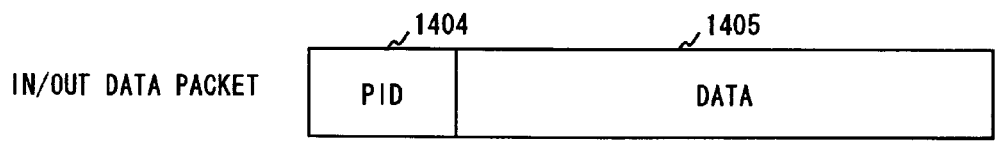
Figure 11D:

Referring next to FIGS. 9 and 10, the operation of the device unit 110 is described. FIG. 9 is a flowchart showing the overall operation of the device unit 110, and FIG. 10 shows an operational flow of the OUT transaction as an example of the transaction executed with the device unit 110.

In step S901, the device controller 111 sets the packet processor 113, the MAC unit 114, and the PHY unit 115 to a waiting state that allows the reception of the token packet. When the MAC unit 114 and PHY unit 115 in the waiting state receives the USB packet (step S902), the MAC unit 114 outputs the reception packet to the packet processor 113 and the packet processor 113 decomposes the reception packet (step S903).

In step S904, the device controller 111 determines whether or not the reception packet is a token packet, and if the reception packet is not a token packet, instructs the packet processor 113 to discard the reception packet (step S905), and keeps the MAC unit 114 and the PHY unit 115 in the waiting state. On the other hand, if the reception packet is a token packet, the device controller 111 further determines whether or not the token packet address (ADDR) 1402 indicates own device (step S906).

If the received token packet is determined to be addressed to own device, the device controller 111 executes the designated transaction (step S907). If it is determined that the received token packet is not addressed to own device, the controller further determines whether or not the received token packet is added with the general token transmission time (GTT) (step S908). If the general token transmission time (GTT) is not added, the received token packet is a general token packet, so the device controller 111 keeps the MAC unit 114 and the PHY unit 115 in a waiting state.

On the other hand, if the general token transmission time (GTT) is added, the received token packet is a specific token packet, so the device controller 111 changes the packet processor 113, the MAC unit 114, and the PHY unit 115 to a suspend state to disallow the transmission/reception of radio data (step S909). The device controller 111 returns the process, at the time for return to the waiting state, which is set based on the general token transmission time (GTT), to step S901 to set the packet processor 113, the MAC unit 114, and the PHY unit 114 in the waiting state (step S910).

Referring now to FIG. 10, a processing flow of the OUT transaction as an example of the transaction executed in step S907 is described. First, in step S1001, the MAC unit 114 removes the MAC header from the OUT data packet received from the host device 100, and output the obtained data to the packet processor 113. In step S1002, the device controller 111 instructs the packet processor 113 to decompose the OUT data packet received with the MAC unit 114. The packet processor 113 stores data extracted from the OUT data packet in the data buffer 112.

In step S1003, the device controller 111 instructs the packet processor 113 to create the handshake packet. In step S1004, the device controller 111 instructs the MAC unit 114 to transmit the handshake packet created with the packet processor 113. The instructed MAC unit 114 adds the MAC header to the handshake packet to be output to the PHY unit 115, and the PHY unit 115 transmits the handshake packet to the host device 100.

In step S1005, the device controller 111 instructs the data buffer 102 to output the received data from the host device 100 to the upper layer controller 80.

With the foregoing construction and operation of the device units 110, the device units 110 can shift to the suspend state in response to the specific token packet not addressed to own device, which is sent from the host device 100.

In the case of applying the radio communication technique such as IEEE802.15.3 or IEEE802.15.4 to the MAC unit 104 and PHY unit 105 of the host device 100 and the MAC unit 114 and PHY unit 115 of the device units 110, the following operation may be additionally performed.

In IEEE802.15.3 or IEEE802.15.4, a frame structure called a super frame is adopted. For example, the super frame of IEEE802.15.3 starts with a beacon, and a period until the next beacon (beacon interval) is divided into CAP (contention access period) and CTAP (channel time allocation period). The CAP is shared among all the IEEE802.15.3 devices (that is, all devices adopting IEEE802.15.3 inclusive of the host device 100 and the device units 110 according to the present invention) to allow accesses from all the IEEE802.15.3 devices. On the other hand, the CTAP is a period during which a specific IEEE802.15.3 device (for example, host device 100 and device units 110 according to the present invention) can exclusively access. In the CAP, a medium access control based on a CSMA/CA (carrier sense multiple access with collision avoidance) is performed, while in the CTAP, a medium access control based on a TDMA (time division multiple access) is performed.

In the USB system 1 according to this embodiment, the host device 100 completely controls the transmission time of plural device units 110. Therefore, in the case of applying the radio communication technique adopting two kinds of medium access control, CSMA/CA and TDMA similar to the foregoing technique of IEEE802.15.3 to the data exchange between the host device 100 and the plural device units 110, the general transaction started with the general token packet is carried out with a time slot (CTA: channel time allocation) allocated for a wireless USB in the CTAP in principle.

On the other hand, as for the transaction started with a specific token packet, in the case where the CAP period is longer than the time slot (CTA) allocated for the wireless USB, the medium access control method may be switched to execute the data exchange within the CAP period. Further, in addition to the time slot (CTA) allocated in the CTAP, the data exchange may be carried out in the CAP as well, that is, the data exchange may be performed based on the plural medium access control methods. Hence, if the data exchange period longer than a period allocated based on the time slot (CTA) is acquired, a beneficial effect that a large quantity of data in the consecutive transactions can be processed in a short time is achieved.

If two or more medium access control methods can be applied to the MAC unit 104 and PHY unit 105 of host device 100 and the MAC unit 114 and the PHY unit 115 of the device units 110 irrespective of whether or not the wireless communication system is the IEEE802.15.3, a medium access control method used as a basic method is switched to another medium access control method for communications with a specific device, whereby the aforementioned effects can be obtained. More specifically when consecutive transactions started with the specific token packet are executed, a medium access control method used during the general transaction is switched to another medium access control method.

The switching operation may be carried out as follows. For example, description is made of the case in which the MAC unit 104 and PHY unit 105 of host device 100 can adopt two types of medium access control methods, TDMA and CSMA/CA. When the host device 100 executes consecutive OUT transactions (in FIG. 7, the number of transactions M is two or more), the host controller 101 may instruct the switchover of the medium access control method from TDMA to CSMA/CA upon instructing the MAC unit 104 to send OUT data packets in step S721.

Second Embodiment

A USB system 2 according to a second embodiment of the invention includes a host device 200 and plural device units 210. The logical connection form between the host device 200 and the device units 210 in the USB system 2 is the same as the USB system 1 according to the first embodiment shown in FIG. 1. The construction of the USB packets exchanged between the host device 200 and the device units 210 is shown in FIGS. 11A to 11D. In FIGS. 11A to 11D, the same components as the USB packet exchanged in the USB system 1 according to the first embodiment are denoted by same reference numerals. The USB packets used in the USB system 2 differ from the USB packets used in the USB system 1 in that the specific token packet is adds with a specific device address SD1101.

The specific device address SD1101 is an address for designating a device unit (hereinafter, referred to as "specific device") that executes consecutive transactions with the host device. In the first embodiment, a specific device is designated using the address (ADDR) 1402 in the conventional token packet. However, a specific token packet added with the specific device address SD1101 is used aside from the address (ADDR) 1402, by which means the power consumption can be reduced more and more. A timing chart of FIG. 12 is referenced to discuss this.

Figure 12:
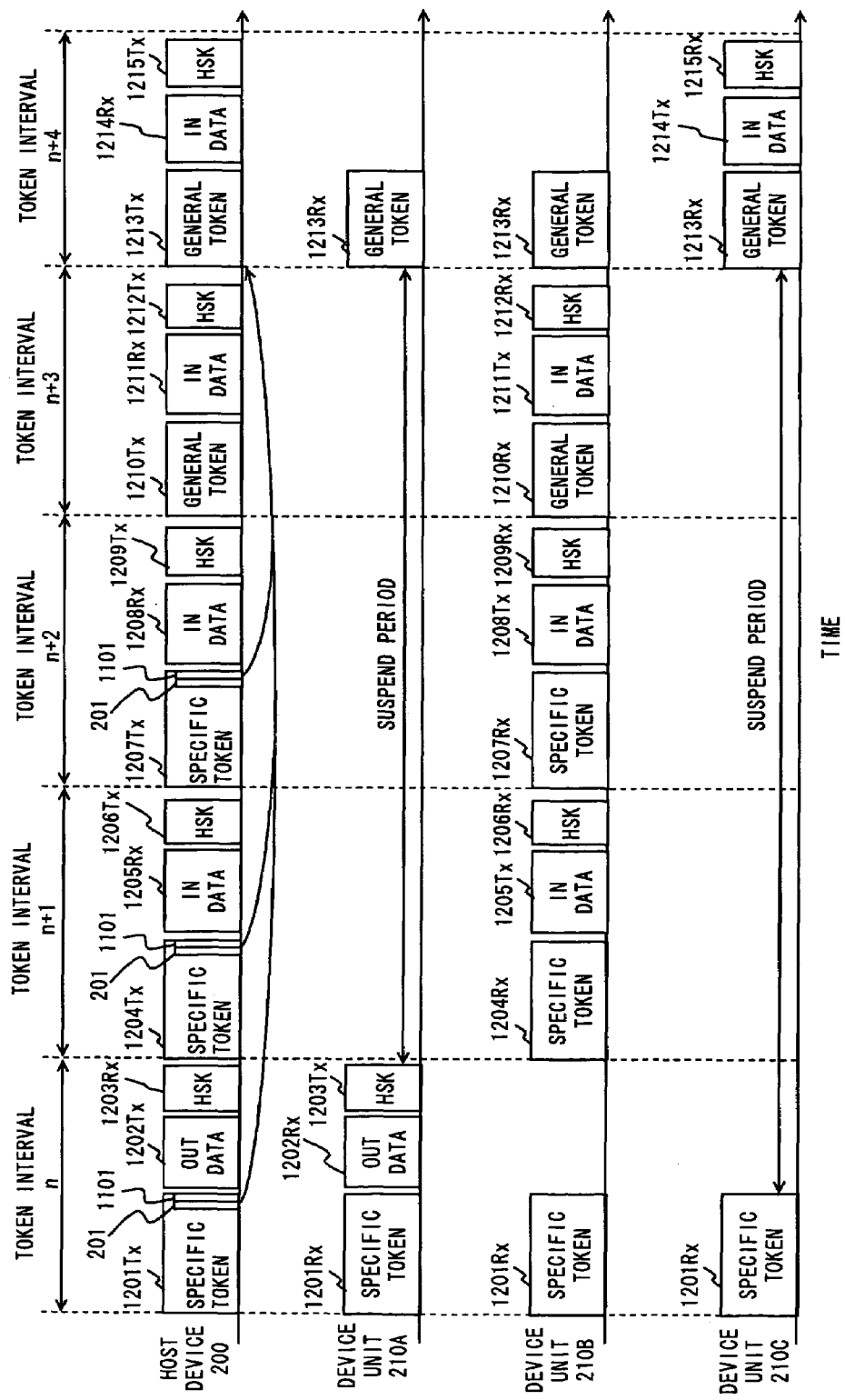
FIG. 12 shows a data transmission/reception timing of the USB system according to the embodiment of the present invention.
Figure 13:
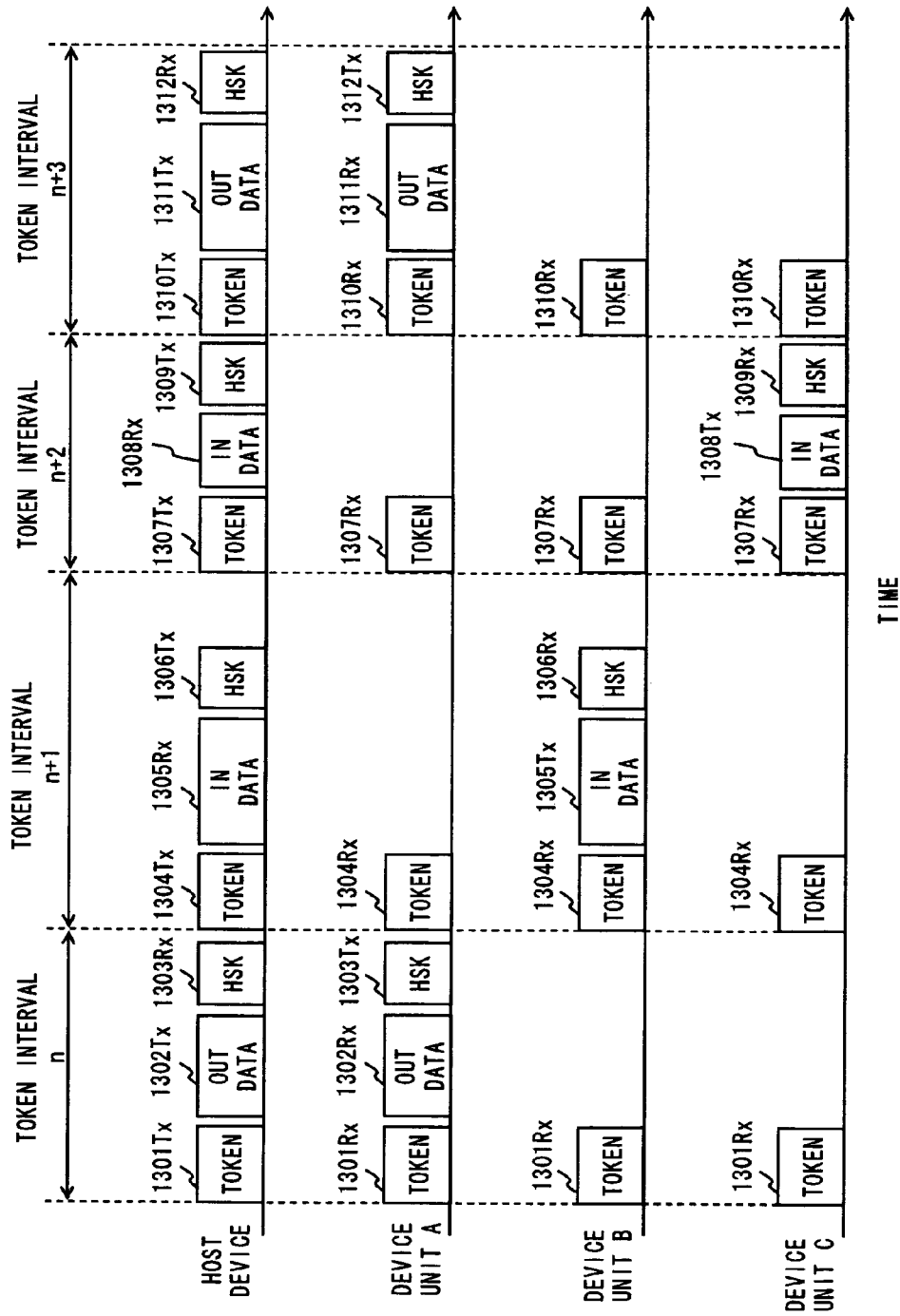
FIG. 13 shows a data transmission/reception timing of a conventional USB system.

FIG. 12 is a timing chart of data transmission/reception timings in the USB system 2. In FIG. 12, for ease of comparison with the USB system 1 according to the first embodiment, the same data transmission/reception processing as that of the timing chart of the USB system 1 in FIG. 3 is illustrated. In FIG. 12 as well, the processing during the token intervals n, n+1, . . . corresponds to one transaction similar to FIG. 3.

In the USB system 2, prior to the consecutive transactions with the device unit 210B in the token intervals n+1 to n+3, a specific token packet 1201 is issued during the token interval n. In this case, an address of the device unit 210A as a corresponding node of the transaction during the token interval n is specified as an address (ADDR) 1402 of the specific token packet 1201, and an address of the device unit 210B as a corresponding node of consecutive transactions during the next token intervals n+1 to n+3 is specified as a specific device address SD1101. Further, in the general token transmission time GTT 201, a transmission time of a general token 1213 corresponding to a token interval n+4 is specified.

The operations of the device units 210A to 210C upon the transmission of the specific token packet 1201 are described below. The address of the device unit 210A is designated as the address (ADDR) 1402 of the specific token packet 1201, so the device unit 210A shifts to a transaction execution state to execute the transaction during the token period n. On the other hand, its address is not designated as the specific device address SD1101, so after the completion of the transaction during the token period n, the device unit 210A shifts to a suspend state.

The address of the device unit 210B is not designated as the address (ADDR) 1402 of the specific token packet 1201 but is designated as the specific device address SD1101. Thus, the device unit 210B stays in the waiting state and waits for the reception of the next token packet 1204.

The address of the device unit 210C is not designated as the address (ADDR) 1402 of the specific token packet 1201 nor the specific device address SD1101. Hence, the device unit 210C determines that own device is not a corresponding node of the transaction during the token interval n and subsequent consecutive transactions (token intervals n+1 to n+3), and thus shifts to the suspend state after receiving the specific token packet 1201.

In a timing chart of FIG. 3 which illustrates the first embodiment of the invention, the device unit 110C cannot shift to the suspend state until the reception of a specific token packet 304 transmitted during the token period n+1 that is the head of consecutive transactions with the device unit 110B. In contrast, in the USB system 2 according to this embodiment, the device unit 210C receiving the specific packet 1201 sent during subsequent token interval n can promptly shift to the suspend state. Therefore, the device unit of the USB system 2 consumes less power than the USB system 1 according to the first embodiment.

In order to send a specific token packet added with the specific device address SD and the general token transmission time GTT during the token interval n prior to the consecutive transactions during the token interval n+1 and subsequent intervals, a host controller 201 of the host device 200 may acquire plural descriptors, for example, two descriptors, upon receiving the descriptor from the upper layer device 50.

More specifically, the host controller 201 that acquires two descriptors calculates the numbers of transactions necessary for the data transmission/reception, which are designated based on the respective descriptors. Even if the number of transactions relative to the previous transaction is 1, as long as the number of transactions relative to the subsequent transaction is 2 or more, the host controller 201 calculates the general token transmission time GTT, and instructs a packet processor 203 of the host device 200 to add the general token transmission time GTT and a specific device address SD.

Further, similar to the first embodiment, in the USB system 2, upon the execution of the consecutive transactions started with a specific token packet, a medium access control method different from the one used in the general transaction started with a general token packet may be used instead. Hence, it is possible to transmit/receive a large quantity of data in the consecutive transactions in a short time.

In the above description of the first and second embodiments, the general token transmission time (GTT) 201 indicating the next transmission time of a general token packet to be sent to all the device units 110 or 210 is added to the specific token packet. However, it is possible to add a completion due time of the consecutive transactions with a specific device to a specific token packet. This completion due time can be calculated based on the data length 63 designated in the descriptor 60 of the host device 100 or 200. Further, if the host device and the device units are out of sync in terms of time, the host device 100 or 200 may add a time interval until the next transmission of the general token packet to be sent to all the device units 110 or 210 or a execution time period of the consecutive transactions with a specific device may be added. In short, the suspend time information added to a specific packet may any information from which the device units 110 or 210 receiving a specific token packet not addressed to own device can understand the next timing for shift to the waiting state.

Further, the present invention is applicable to other systems than the USB systems described in the first and second embodiments of the invention. To be specific, the present invention is applicable to a communication system for exchanging data between the host device and plural device units, which adopts a communication protocol which starts the data exchange between the host device and the device units in response to the token packet from the host device.

It is apparent that the present invention is not limited to the above embodiment that may be modified and changed without departing from the scope and spirit of the invention.

What is claimed is:

1. A host device for transmitting/receiving data to/from a plurality of device units and executing a transaction with the device units in response to a token packet from the host device, comprising:

a packet generator generating a specific token packet including address information of a device unit as a corresponding node and suspend time information upon executing two or more consecutive transactions with the device unit as the corresponding node; and a transmitter transmitting the specific token packet to the plurality of device units to start the consecutive transactions, wherein:

the host device executes a transaction only with the corresponding node designated with the specific token packet until a time period, determined based on the suspend time information added to the specific token packet, elapses.

2. The host device according to claim 1, wherein the suspend time information is derived based on an execution due time of consecutive transactions with the device unit as the corresponding node.

3. The host device according to claim 1, wherein the transmitter includes a medium access control unit that executes data transmission/reception using a first medium access control method upon execution of the consecutive transactions started with the specific token packet, and using a second medium access control method which is different from the first medium access control method upon execution of transactions other than the consecutive transactions.

4. The host device according to claim 3, wherein the medium access control unit executes the data transmission/reception using the first medium access control method and the second medium access control method which is different from the first medium access control method upon execution of the consecutive transactions started with the specific token packet, and using the second medium access control method upon execution of transactions other than the consecutive transactions started with the specific token packet.

5. The host device according to claim 1, wherein the transmitter executes data transmission/reception with the plurality of device units by radio.

6. A host device for transmitting/receiving data to/from a plurality of device units and executing a transaction with the device units in response to a token packet from the host device, comprising:

a packet generator generating, upon execution of a plurality of consecutive transactions with a second device unit after a first transaction with a first device unit, a specific token packet including address information of the first device unit, address information of the second device unit, and suspend time information; and a transmitter transmitting the specific token packet to the plurality of device units to start the first transaction, the host device not executing transactions with the device units other than the first device unit and the second device unit until a time period, determined based on the suspend time information added to the specific token packet, elapses.

7. The host device according to claim 6, wherein the suspend time information is derived from an execution due time of consecutive transactions with the first device unit and the second device unit.

8. The host device according to claim 6, wherein the transmitter includes a medium access control unit that executes data transmission/reception using a first medium access control method upon execution of the first transaction and using a second medium access control method upon execution of the consecutive transactions with the second device unit.

9. The host device according to claim 8, wherein the medium access control unit executes the data transmission/reception using the second medium access control method in addition to the first medium access control method upon execution of the consecutive transactions with the second device unit.

10. A device unit for transmitting/receiving data to/from a host device, comprising:

a receiver receiving a specific token packet including address information of a device unit as a corresponding node and suspend time information, which is sent from the host device; and a controller controlling a device operation based on the specific token packet, which executes data transmission/reception with the host device if the address information in the specific token packet specifies own device, and suspends an operation of the receiver until a return time determined based on the suspend time information if the address information in the specific token packet does not specify own device to resume the operation of the receiver after the return time.

11. The device unit according to claim 10, wherein the specific token packet includes first address information specifying a corresponding node of a first transaction and second address information specifying a corresponding node of a second transaction following the first transaction as the address information, and the controller executes the first transaction with the host device if the first address information in the token packet specifies own device, executes the second transaction with the host device if the second address information in the token packet specifies own device, and suspends an operation of the receiver until a return time determined based on the suspend time information to resume the operation of the receiver if the first address information and the second address information in the token packet do not specify own device.

12. A communication system, comprising:
a host device; and
a plurality of device units, the communication system starting data transmission/reception between the host device and the device units in response to a token packet sent from the host device, the host device sending a specific token packet including suspend time information and address information of a first device unit out of the plurality of device units to the plurality of device units upon consecutively executing a plurality of transactions with the first device unit, the first device unit receiving the specific token packet to execute data transmission/reception with the host device through the plurality of transactions, and the plurality of device units other than the first device unit receiving the specific token packet to stop a data transmission/reception operation with the host device until a return time determined based on the suspend time information and resume the data transmission/reception operation after the return time.

13. The communication system according to claim 12, wherein the host device derives the suspend time information based on an execution time of consecutive transactions with the first device unit as the corresponding node.

14. A data transmission/reception method used for a host device communicating with a plurality of device units, comprising:

generating a specific token packet including address information of a device unit as a corresponding node and suspend time information upon executing two or more consecutive transactions with the device unit as the corresponding node;

transmitting the specific token packet to the plurality of device units at the start of the transactions with the device unit;

executing the two or more transactions with the device unit as the corresponding node; and executing a transaction with the device units other than the device unit as the corresponding node after the elapse of a time determined based on the suspend time information.

15. The data transmission/reception method according to claim 14, wherein data transmission/reception is executed using a first medium access control method upon execution of the consecutive transactions started with the specific token packet, and using a second medium access control method which is different from the first medium access control method upon execution of transactions other than the consecutive transaction started with the specific token packet.

16. The data transmission/reception method according to claim 15, wherein the data transmission/reception is executed using the first medium access control method and the second medium access control method which is different from the first medium access control method upon execution of the consecutive transactions started with the specific token packet, and using the second medium access control method upon execution of transactions other than the consecutive transaction started with the specific token packet.

17. A data transmission/reception method used for a host device communicating with a plurality of device units, generating, upon executing a plurality of consecutive transactions with a second device unit following a first transaction with a first device unit, a specific token packet including suspend time information derived from an execution time of the first transaction and the consecutive transactions with the second device unit, and address information of the first device unit and the second device unit;

transmitting the specific token packet to the plurality of device units at the start of the first transaction;

executing the first transaction with the first device unit;

executing the consecutive transactions with the second device unit; and executing transactions with the device units other than the first device unit and the second device unit after the elapse of a time determined based on the suspend time information.

18. The data transmission/reception method according to claim 17, wherein data transmission/reception is executed using a first medium access control method upon execution of the first transaction and using a second medium access control method upon execution of the consecutive transactions with the second device unit.

19. The data transmission/reception method according to claim 18, wherein the data transmission/reception is executed using the first medium access control in addition to the second medium access control method upon execution of the consecutive transactions with the second device unit.

20. A data transmission/reception method used for a host device communicating with a plurality of device units, said method comprising:

receiving from the host device a specific token packet including address information of a first device unit as a corresponding node, and suspend time information;

executing data transmission/reception if the address information in the specific token packet specifies a target device; and executing a transaction with the device units other than the first device unit after the elapse of a time determined based on the suspend time information, and suspending a data transmission/reception operation with the host device until a return time determined based on the suspend time information if the address information in the specific token packet does not specify the target device until the return time determined based on the suspend time information to resume the data transmission/reception operation after the return time.

21. The data transmission/reception method according to claim 20, wherein the token packet includes as the address information, first address information specifying a device unit as a corresponding node of a first transaction and second address information specifying a device unit as a corresponding node of a second transaction following the first transaction, if at least one of the first address information and the second address information in the specific token packet specifies a target device unit, the target device unit executes at least one of the first transaction and the second transaction with the host device, and if the first address information and the second address information do not specify the target device unit, a reception operation is stopped until a return time determined based on the suspend time information to resume the reception operation after the return time.

22. A data transmission/reception method used in a communication system including a host device and a plurality of device units and starting data transmission/reception between the host device and the device units in response to a token packet sent from the host device, comprising:

causing the host device to send to the plurality of device units, a token packet including address information of a first device unit out of the plurality of device units and suspend time information derived from an execution time of a plurality of consecutive transactions upon execution of the plurality of consecutive transactions with the first device unit;

causing the first device unit to receive the token packet to execute data transmission/reception with the host device through the plurality of transactions; and causing the plurality of device units other than the first device unit to receive the token packet to stop a data transmission/reception operation with the host device until a return time determined based on the suspend time information and resume the data transmission/reception operation with the host device after the return time.

* * * * *